US012747849B2

(12) United States Patent
Mckenzie et al.

(10) Patent No.: US 12,747,849 B2
(45) Date of Patent: Sep. 29, 2026

(54) PHOTOLUMINESCENT SIGN WITH TRANSIENT-SUPPRESSED LED CIRCUIT

(71) Applicant: ECOGLO INTERNATIONAL LIMITED, Christchurch (NZ)

(72) Inventors: Roger Mckenzie, Christchurch (NZ); Trevor Dimond, Christchurch (NZ)

(73) Assignee: ECOGLO INTERNATIONAL LIMITED, Christchurch (NZ)

( * ) Notice: Subject to any disclaimer, the term of this patent is extended or adjusted under 35 U.S.C. 154(b) by 154 days.

(21) Appl. No.: 18/930,528

(22) Filed: Oct. 29, 2024

(65) Prior Publication Data

US 2025/0052401 A1 Feb. 13, 2025

Related U.S. Application Data

(63) Continuation of application No. 17/260,053, filed as application No. PCT/NZ2019/050081 on Jul. 12, 2019, now Pat. No. 12,152,772.

(30) Foreign Application Priority Data

Jul. 13, 2018 (NZ) ........................................ 744322

(51) Int. Cl.

| | |
|---|---|
| ***H02M 7/06*** | (2006.01) |
| ***F21V 9/30*** | (2018.01) |
| ***G09F 13/20*** | (2006.01) |
| ***G09F 13/22*** | (2006.01) |
| ***H02M 1/12*** | (2006.01) |
| ***H02M 7/04*** | (2006.01) |
| ***H05B 45/00*** | (2022.01) |

(Continued)

(52) U.S. Cl.
CPC ................ *F21V 9/30* (2018.02); *G09F 13/22* (2013.01); *H02M 1/126* (2013.01); *H02M 7/062* (2013.01); *H05B 45/00* (2020.01); *H05B 45/355* (2020.01); *H05B 45/50* (2020.01); *H05B 45/59* (2022.01); *F21Y 2115/10* (2016.08); *G09F 2013/222* (2013.01); *H02M 7/05* (2021.05)

(58) Field of Classification Search
CPC ............... G09F 13/22; G09F 2013/222; G09F 2013/05; G09F 13/18; G09F 13/20; H05B 45/355; H05B 45/00; H05B 45/59; H02M 7/062; H02M 7/05; H02M 7/06
See application file for complete search history.

(56) References Cited

U.S. PATENT DOCUMENTS

| | | | | |
|---|---|---|---|---|
| 5,936,599 A * | 8/1999 | Reymond | ................ | G09G 3/32 345/82 |
| 6,141,234 A * | 10/2000 | Knoble | ..................... | H02J 7/02 362/20 |

(Continued)

FOREIGN PATENT DOCUMENTS

| | | |
|---|---|---|
| CA | 2920722 | 8/2016 |

*Primary Examiner* — Sisay G Tiku
(74) *Attorney, Agent, or Firm* — ARC IP Law, PC; Joseph J. Mayo

(57) ABSTRACT

The invention relates to photoluminescent signs, in particular to signs in which one or more light emitting diodes (LEDs) emit light that excites one or more photoluminescent (PL) elements. In one aspect, a sign may include one or more photoluminescent elements; one or more light emitting diodes (LEDs) arranged to excite the one or more photoluminescent elements; and circuitry arranged for connection to an AC power supply and supplying power to the LEDs.

18 Claims, 5 Drawing Sheets

(51) Int. Cl.

| | |
|---|---|
| ***H05B 45/355*** | (2020.01) |
| ***H05B 45/50*** | (2022.01) |
| ***H05B 45/59*** | (2022.01) |
| *F21Y 115/10* | (2016.01) |

(56) References Cited

U.S. PATENT DOCUMENTS

| | | | | |
|---|---|---|---|---|
| 10,219,334 | B2 * | 2/2019 | Busse | H05B 45/39 |
| 2011/0210861 | A1 * | 9/2011 | Winton | G08B 7/062<br>340/815.45 |
| 2012/0233895 | A1 * | 9/2012 | Martin | F21K 2/00<br>252/301.36 |
| 2013/0187556 | A1 * | 7/2013 | Zeng | C09K 11/77212<br>315/246 |
| 2015/0351172 | A1 * | 12/2015 | Hung | H05B 47/25<br>315/250 |
| 2020/0292161 | A1 * | 9/2020 | Majewski | H05B 45/37 |

* cited by examiner

PHOTOLUMINESCENT SIGN WITH TRANSIENT-SUPPRESSED LED CIRCUIT

This application is a continuation of U.S. Utility patent application Ser. No. 17/260,053 filed 13 Jan. 2021, which is a 371 of International PCT Patent Application Serial No. PCT/NZ2019/050081 filed 12 Jul. 2019, which claims priority from New Zealand patent application number NZ744322 filed 13 July 2018, the contents of which are incorporated herein by reference.

BACKGROUND OF THE INVENTION

Field of the Invention

The invention relates to photoluminescent signs, in particular to signs in which one or more light emitting diodes (LEDs) emit light that excites one or more photoluminescent (PL) elements.

Description of the Related Art

Photoluminescent (PL) signs are used in various applications, including for example emergency signs in buildings. Photoluminescent elements may be arranged such that light from an included light source falls on the photoluminescent elements, exciting the photoluminescent material which will subsequently relax, emitting light over a time period.

Some prior signs use LED light sources to excite the photoluminescent elements. In some hybrid signs, such as that disclosed in CA2920722, a translucent PL element is used, such that light from the LEDs partly passes through the PL element and is partly absorbed in the PL element. This provides a hybrid sign with illumination from the LED light and from the emitted photoluminescence. The LED light will only be visible when electrical power is available. The photoluminescence will be visible for a period of time after electrical failure.

A simple LED lighting circuit, such as might be used in ambient or task lighting, is shown in FIG. 1. AC power from a mains source is rectified and passed to the LEDs. As shown in FIG. 1, the rectified part of the circuit may include an electrolytic capacitor to provide transient suppression and/or smoothing of the rectifier output.

LED lighting circuits for use in hybrid PL/LED signs may be designed to control the current through the LEDs in order to provide a consistent light output and to avoid damaging the LEDs by exposing them to high currents. It is desirable for the LED circuit to be capable of handling power surges. Some prior circuits use an electrolytic capacitor provided in parallel with the LEDs, in the rectified part of the circuit. This has the effect of smoothing power surges, and also provides some smoothing of the normal output from the rectifier.

Prior hybrid PL/LED signs generally use active switched circuits (power electronics) to regulate the LED current. This requires a high part count leading to cost, complexity and low mean time to circuit failure.

Further, a short life time of the circuit results in high costs due to replacement and maintenance requirements, particularly in critical emergency systems such as emergency exit signs.

One prior hybrid sign (sold as the Cleverfit Pro) is believed to provide some absorption of transients in parallel with the power circuit. However, Applicant believes that only a portion of the transient is blocked in this design and the sensitive circuitry still experiences substantial transient. Further, the Cleverfit Pro circuit is complex and relies on the use of electrolytic capacitors.

It would be desirable to provide a hybrid PL/LED sign with improved cost and/or lifetime and/or power usage, or at least to provide the public with a useful choice.

BRIEF SUMMARY OF THE INVENTION

In one aspect, a sign may include one or more photoluminescent elements; one or more light emitting diodes (LEDs) arranged to excite the one or more photoluminescent elements; and circuitry arranged for connection to an AC power supply and supplying power to the LEDs. Part of the circuitry may be an AC circuit portion receiving power from the AC power supply and including one or more transient suppression components arranged to suppress transients in power received from the power supply. The circuitry may also include a rectifier arranged to receive and rectify transient-suppressed power; and a DC circuit portion receiving rectified power from the rectifier and passing the rectified power to the LEDs, the DC circuit portion being free of electrolytic capacitors.

In another aspect, a sign may include one or more photoluminescent elements; one or more light emitting diodes (LEDs) arranged to excite the one or more photoluminescent elements; and circuitry arranged for connection to an AC power supply and supplying power to the LEDs. Part of the circuitry may be an AC circuit portion receiving power from the AC power supply and including one or more transient suppression components arranged to suppress transients in power received from the power supply. The circuitry may also include a rectifier arranged to receive and rectify transient-suppressed power; and a DC circuit portion passing substantially unsmoothed rectified power to the LEDs.

In a further aspect, a sign may include one or more photoluminescent elements; one or more light emitting diodes (LEDs) arranged to excite the one or more photoluminescent elements; and circuitry arranged for connection to an AC power supply and supplying power to the LEDs. The circuitry may include: an AC circuit portion receiving power from the AC power supply; one or more transient suppression components provided only in the AC circuit portion, arranged to suppress transients in power received from the power supply; a rectifier arranged to receive and rectify transient-suppressed power; and a DC circuit portion passing rectified power to the LEDs.

In another aspect, a sign may include one or more photoluminescent elements; one or more light emitting diodes (LEDs) arranged to excite the one or more photoluminescent elements; and circuitry arranged for connection to an AC power supply and supplying power to the LEDs. The circuitry may include: one or more transient suppression components arranged to suppress transients in power received from the AC power supply; and a rectifier arranged to receive transient-suppressed power and to pass rectified power to the LEDs.

The following features of the Applicant's signs relate to any of the above aspects.

The one or more transient suppression components may include a shunt transient suppression device. The shunt transient suppression device may be a transient suppression diode.

The one or more transient suppression components may include one or more components providing a series resistance tending to block transients from entering the circuitry.

The one or more transient suppression components may include an RC transient filtering circuit. The one or more transient suppression components may include: one or more components providing a series resistance tending to block transients from entering the circuitry; a shunt transient suppression device; and an RC transient filtering circuit.

The transient suppression components may include one or more series-connected suppression components and one or more suppression components connected in parallel with the rectifier.

The circuitry may be free of electrolytic capacitors.

The sign may be arranged to draw less than 2 Watts in normal operating conditions. The sign may be arranged to draw less than 1 Watt in normal operating conditions. The sign may be arranged to draw around 0.5 Watts in normal operating conditions.

The sign may include one or more sign elements. The one or more sign elements may include one or more emergency sign elements.

At least some of the one or more photoluminescent elements may be translucent, such that some of the light emitted by the LEDs excites the photoluminescent elements and some of the light emitted by the LEDs passes through the photoluminescent elements.

The sign may include one or more sign elements, wherein light emitted by the photoluminescent elements and light passing through the photoluminescent elements passes through the one or more sign elements.

The sign may be a two-sided sign, each side of the sign including a photoluminescent element, wherein light is free to pass between the two sides of the sign.

The AC power source may be a mains source.

The LEDs may be powered by substantially unsmoothed rectified power at twice the frequency of the AC power source.

BRIEF DESCRIPTION OF DRAWINGS

The invention will be described by way of example only, with reference to the accompanying drawings, in which.

DETAILED DESCRIPTION OF THE INVENTION

Figure 1:
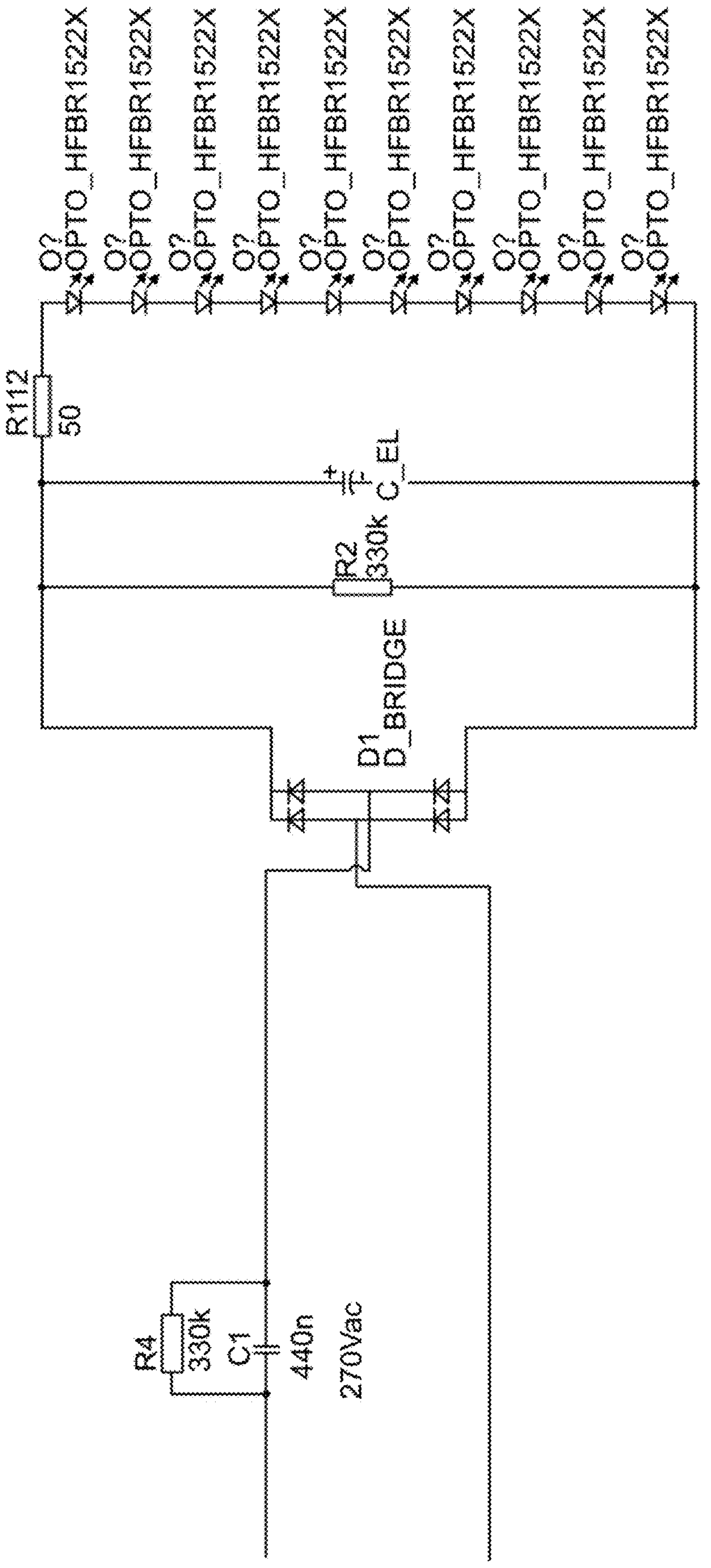
FIG. 1 (PRIOR ART)
FIG. 1 shows a prior art LED ambient lighting circuit.

According to one embodiment, a hybrid photoluminescent (PL)/LED light includes an AC circuit portion that receives AC power from a source (e.g. a mains source) and passes AC power to a rectifier. The rectified power is provided to a rectified (or DC) circuit portion, which includes (or is arranged for connection to) one or more LEDs. The LEDs may be arranged to emit light directly or indirectly onto one or more PL elements. Due to the nature of the PL material, this excites the material of the one or more PL elements which then emit light over a time period. The PL material will therefore emit PL light while it is being illuminated by the LED light, and for a period of time after it stops being illuminated by the LED light (e.g. in the event of power failure). Typically, such hybrid signs may be used in buildings to indicate emergency exits etc, but may also be used in other applications. The signs may be arranged for mounting on any suitable surface, including ceilings, walls, door frames etc.

Suitable PL materials are well known in the art and need not be discussed in detail in this specification. However, in one embodiment the PL pigment may be a pigment as disclosed in Nemoto and Co Ltd's U.S. Pat. No. 5,424,006 or U.S. Pat. No. 5,686,022. In one embodiment the PL pigment may contain Strontium Aluminate (96%), Europium Oxide (2%), and Dysprosium Oxide (2%) with small amounts of other chemicals as described in Nemoto and Co Ltd's U.S. Pat. No. 5,424,006 or U.S. Pat. No. 5,686,022.

The PL element may include a PL material distributed or embedded in a matrix. The PL material may be a particulate or pigment. The matrix may be a liquid matrix that sets or cures to a solid form. A suitable PL material can be embedded in the liquid matrix, which is then cured to form a solid PL element. Alternatively, the matrix may be a dry powder matrix that melts when heated. In this case the powder may be mixed with PL material and then heated in an oven to form a solid PL element. Other arrangements of PL material and matrix may also be suitable.

In some embodiments the PL element is formed from materials that are at least partially transparent, and preferably highly transparent, to both the charging wavelengths from the LED and the emitted wavelengths from the PL material.

A PL material with at least 400 g/m2 of PL pigment (or "phosphor") may provide sufficient luminance, depending on the application. For example, this is expected to provide sufficient luminance for a low power sign such as that described below to be fit for purpose. The Applicant's sign is expected to be sufficiently visible during normal use as well as for 90 minutes after loss of power to the main lighting circuit.

In further embodiments, a higher density of PL pigment may be used. For example, by use of the Applicant's circuit with a PL material with greater amount of PL pigment, e.g. 800 g/m2 or 1200 g/m2, the sign can provide a faster charging of the PL material (e.g. less than 5 minutes). This may enable the sign to be connected to a non-continuous power supply, which will further increase the life of the sign and reduce energy use. It also means that after a power failure, the sign will be ready for use again almost immediately after the power supply resumes. In comparison, battery back up signs may take several hours to charge up, and therefore need to be continuously powered whether or not the building is occupied, which impacts the sign's longevity and energy use.

Any suitable LEDs may be used to provide light suitable for exciting the PL material used. Suitable LEDs may include semiconductor LEDs or organic LEDs (OLEDs). Coloured or white LEDs may be used, depending on the application and suitability for the PL material used.

The circuit may include one or more transient suppression components. In some embodiments, transient suppression components may be provided only in the AC circuit portion. The resulting transient suppression may be capable of dispersing the power from several consecutive power surges of 4 kV with a 1 micro second up lift (positive or negative) and a 50 micro second fall, while ensuring that current flowing to the LEDs remains below a threshold (e.g. 10 A) to prevent damage to the LEDs. One standard requires the circuit to be capable of dispersing at least five positive and five negative surges.

In preferred embodiments the transient suppression is achieved without the use of electrolytic capacitors. Electrolytic capacitors have been used in prior signs, but Applicant believes that they limit the circuit lifetime.

Further, Applicant's circuit may provide power to the LEDs without any smoothing, or substantially without smoothing, of the power output by the rectifier. The supply of substantially unsmoothed rectified power to the LEDs results in a flicker of the LEDs at twice the frequency of the AC power source. For example, for 50 Hz AC sources, the LED flicker will be 100 Hz; while for 60 Hz AC sources, the LED flicker will be 120 Hz. In general lighting (e.g. task or ambient lighting), LED flicker may be considered undesirable. However, Applicant believes such flicker in light used to illuminate the PL material to be acceptable. Any flicker in the light output by the sign is believed to be acceptable given the generally low levels of light emitted. Further, the excitation of the PL material and subsequent emission of light over a time period may provide some smoothing of the flicker from the LEDs. In preferred embodiments the rectified or DC circuit portion may be free of transient suppression components.

In some embodiments the transient suppression arrangement may include several transient suppression components.

Figure 2:
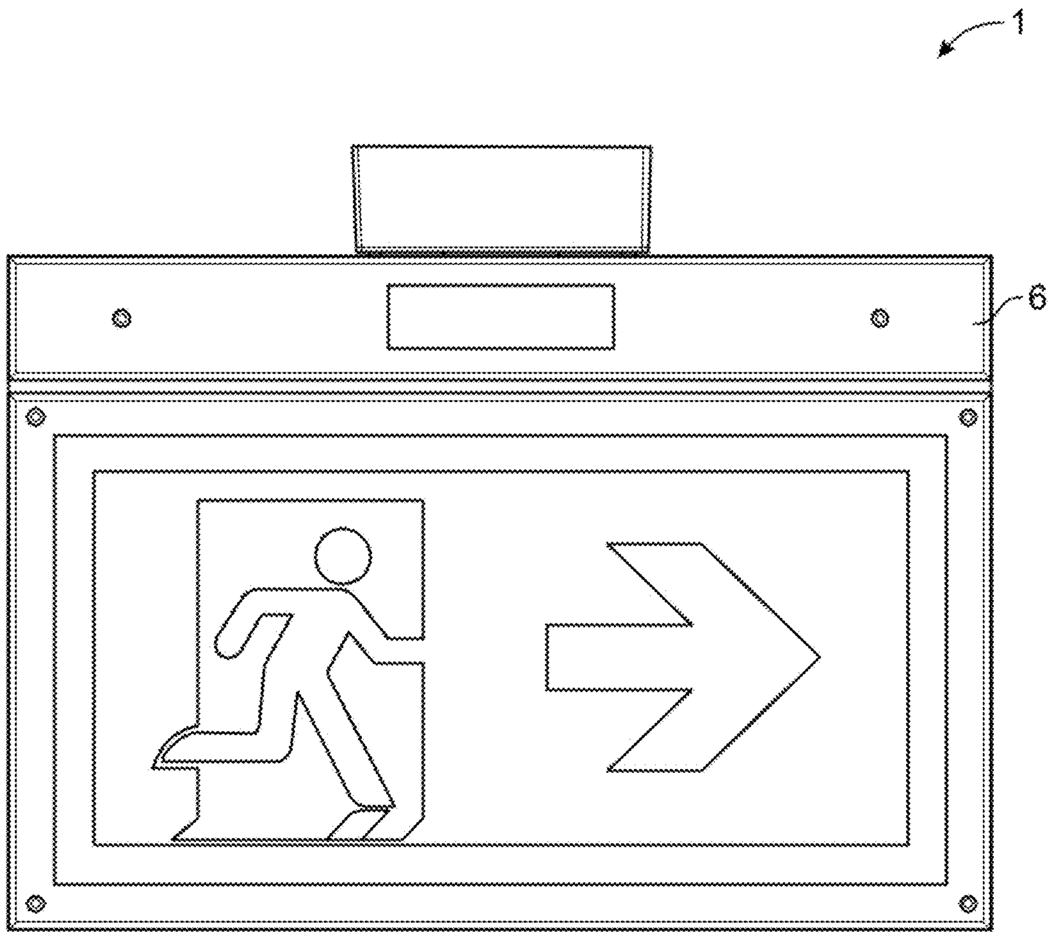
FIG. 2 is a front view of a hybrid PL/LED sign according to one or more embodiments of the invention.
Figure 3:
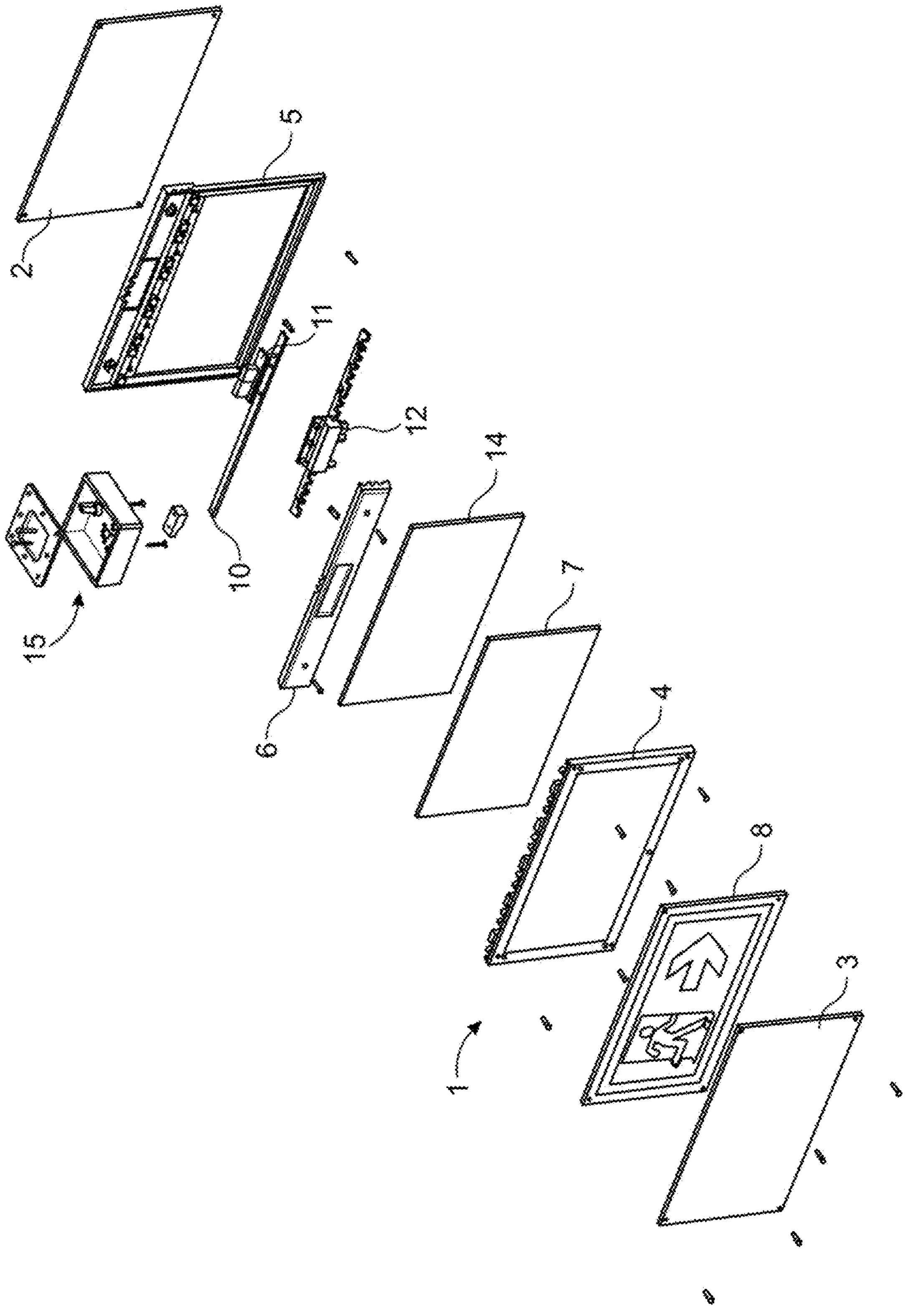
FIG. 3 is an exploded view of the sign of FIG. 2 according to one or more embodiments of the invention.

FIG. 2 shows a hybrid PL/LED sign 1 according to one embodiment. FIG. 3 is an exploded view of the sign 1 of FIG. 2. The sign 1 includes a sign frame or housing formed by a rear element 2, transparent front element 3 and a number of intermediate housing elements 4, 5, 6. The skilled reader will understand that various different structural arrangements may be used and the invention is not limited in this respect.

A photoluminescent element 7 is arranged to emit light through a sign element 8. The photoluminescent element may be translucent. In the configuration shown the photoluminescent element 7 is a photoluminescent plate and the sign element 8 is a graphic mask. Various graphics may be used, with the "running figure" and arrow shown in FIGS. 2 and 3 being just one example. Other sign embodiments may display other graphics, words, symbols etc. Further, in some embodiments the sign elements may be formed directly in the photoluminescent material, rather than provided separately as a mask. It is not the Applicant's intention to limit the invention to particular arrangements of photoluminescent material and/or sign elements.

An LED light source may be provided on LED board 10. The LED light source consists of one or more, but desirably of two or more LEDs. In one embodiment around 18 LEDs may be used. The LED board may receive power from a separate driver board 11. A cover 12 may be provided to protect the LED board 10 and/or driver board 11.

Light emitted by the LEDs passes through a light pipe or guide plate 14, which is designed to disperse the LED light such that it falls relatively evenly over the surface of the photoluminescent element 7. The sign 1 is therefore arranged such that light from the LEDs excites the photoluminescent material in the photoluminescent element 7. In general, the LEDs are arranged to emit light, directly or indirectly, onto the PL material. Any suitable optical elements may be used to direct light onto the PL material. Light emitted by the photoluminescent element 7 then passes through the sign element 8, creating a lit sign with the graphics, symbols or words of the sign element 8. Where the PL material is translucent, both light emitted by the photoluminescent element 7 and light emitted by the LEDs that is not absorbed by the photoluminescent element 7 may pass through the sign element 8 to create the lit sign. Further, the inner surface of the rear element 2 may be reflective such that any LED light or PL light incident upon the rear element 2 is redirected towards the front of the sign, i.e. towards the sign element 8 and front element 3.

A mounting arrangement 15 serves to mount the housing 2-6 to a structure.

Figure 4:
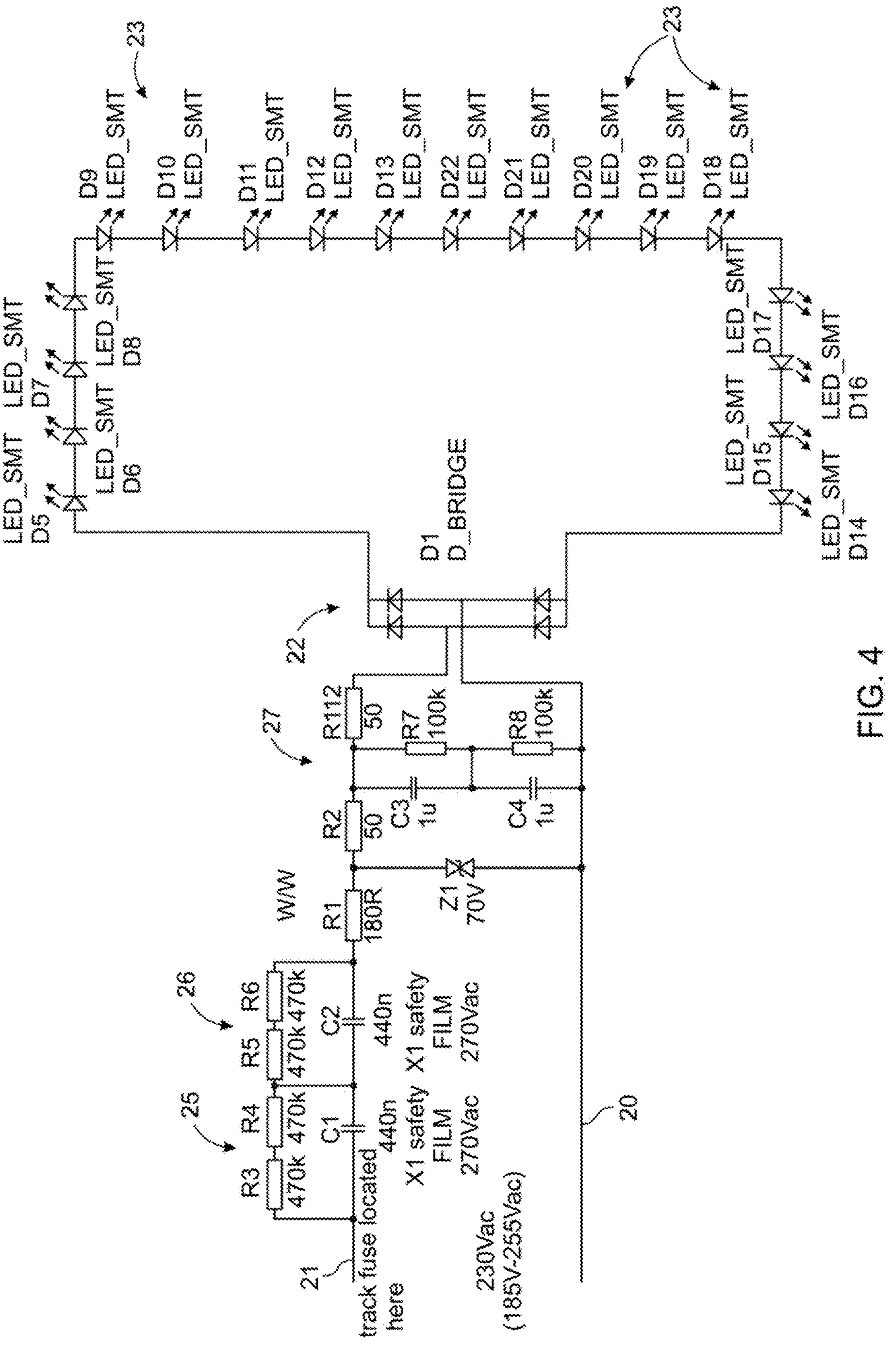
FIG. 4 shows a circuit arranged to power a hybrid sign's LEDs from an AC power source, according to one or more embodiments of the invention.

FIG. 4 shows an LED circuit according to one embodiment. This circuit receives AC power from an AC source (e.g. mains source, not shown) via connections 20, 21. The AC power is rectified at rectifier 22 and the rectified power passed to LEDs 23. The rectified circuit portion (i.e. that part of the circuit positioned after the rectifier 22) may be free of transient suppression components. The rectified circuit portion may be free of electrolytic capacitors. In the embodiment shown the rectified circuit portion includes only LEDs, with unsmoothed or substantially unsmoothed rectified power being supplied from the rectifier to the LEDs.

As shown in FIG. 4, the AC circuit portion (i.e. that part of the circuit positioned before the rectifier 22) may include a number of transient suppression components. In the embodiment shown, during normal operation, power runs through the capacitors C1, C2, the resistors R1, R2, R112, through the rectifier 22 and to the LEDs 23. In general, the series connected capacitors C1, C2 and resistors R1, R2, R112 act to reduce the source voltage and current to a level suitable for powering the LEDs. The series resistance provided by these components in combination with resistors R3, R4, R5, R6 limits any transient current and tends to block transients from entering the circuit. As a result, a shunt transient suppression device (in FIG. 4 provided by transient suppression diode Z1) does not work so hard and it is able to contain more of any transient that does enter the circuit. In addition, an RC circuit 27 (including the capacitors C3 and C4 and resistors R7 and R8) downstream of the shunt transient suppression device Z1 further filters any remaining transient. By the time a transient gets to the rectifier 22, the transient current may be less than 1/100th its original size. In preferred embodiments the Applicant therefore uses two or suppression mechanisms to provide transient suppression.

In the embodiment shown in FIG. 4, the circuit is designed to cope with power surges (positive or negative) of 2 kV converting to around 1kA, the final current reaching the LEDs being consistently around or less than 10A. The transient suppression components act to dissipate surges and resulting excess power.

In general, embodiments may provide one or more series-connected suppression components, such as loops 25, 26; and/or one or more parallel-connected components such as the transient suppression diode Z1 and loops 27. In preferred embodiments both series and parallel-connected suppression components may be included.

In the embodiment of FIG. 4, the various components may have the values (e.g. capacitance value, resistance value etc) shown in that diagram. However, the skilled reader will understand that the components and their values may be varied while providing the required functionality.

Figure 5:
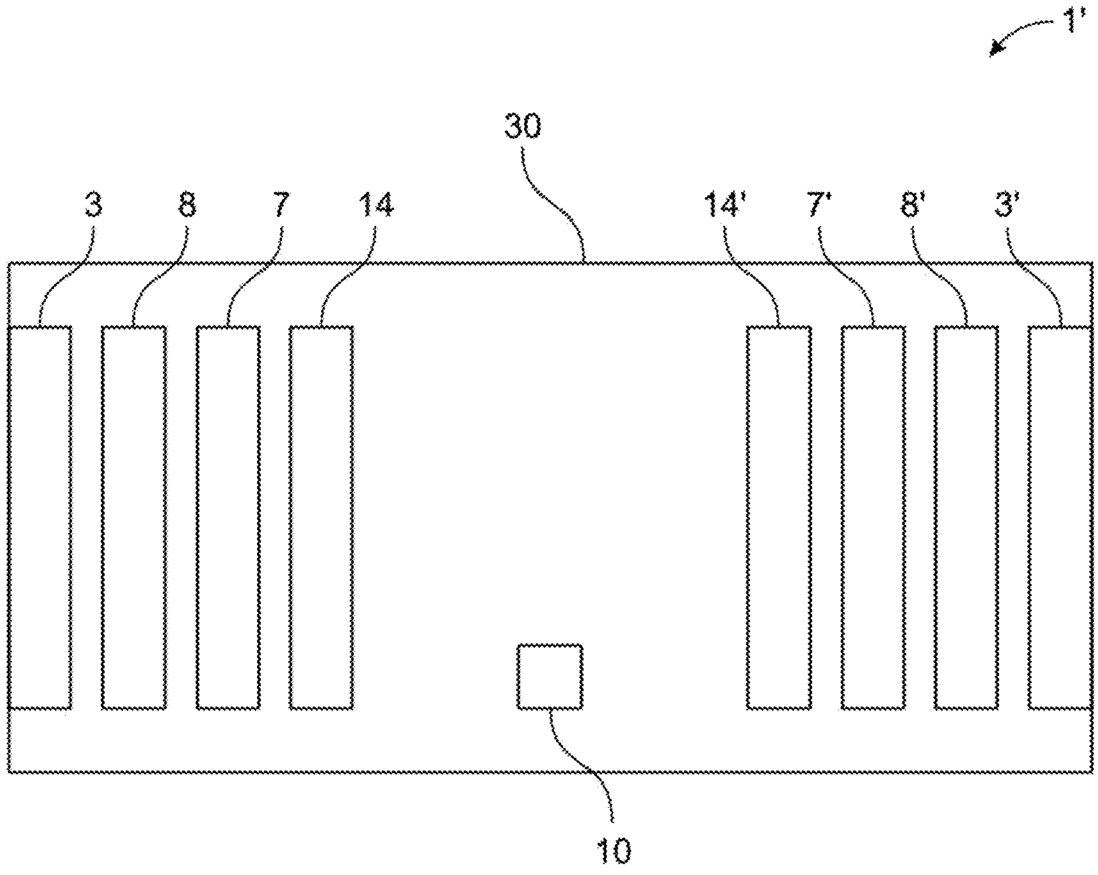
FIG. 5 is a schematic drawing showing a layout of a two-sided hybrid PL/LED sign, according to one or more embodiments of the invention.

FIG. 5 is a schematic diagram illustrating how the circuit and components of FIGS. 3 and 4 may be used in constructing a two-sided sign 1'. The sign may include a two-sided housing 30. A single LED board 10 may be used to illuminate both sides of the sign 1'. This is in contrast to known signs that use two sets of LEDs to illuminate the two sides of the double-sided sign and use almost twice the power of a similar sign with only one set of LEDs.

Each side of the double-sided sign may include a light pipe or guide plate 14, 14'; a PL element 7, 7'; a sign element 8, 8'; and a front element 3, 3'. The skilled reader will understand that FIG. 5 is a schematic view only, and other components may be included as necessary, including components shown in FIGS. 2 to 4.

In some embodiments there may be no optical separation of the two sides of the sign (e.g. in the embodiment of FIG. 5 there is no equivalent of a reflective rear element 2 such as may be used in the embodiment of FIG. 3). This means that LED light or PL light from one side of the sign is free to pass into the other side of the sign. This allows two PL elements to be charged from the circuit of FIG. 4, with the same power usage as described above.

In a single sided sign using a reflective layer behind the PL element, some light is inevitably not reflected back and the single sided sign is therefore not perfectly efficient. In a double-sided sign without a reflective layer, a portion of light from each side passes in the reverse direction into the other side, both during charging and discharge of the PL element. As a result of the efficiency gained by omitting the reflective element, the brightness of the double-sided sign under LED lighting or under PL lighting remains acceptable, with the same power use as a single sided sign with a reflective layer.

The Applicant's sign avoids the need for the use of an electrolytic capacitor to protect LEDs from surges. This improves the lifetime of the circuit. Further, there is no need for each LED light to have a trip circuit. The Applicant's circuit is relatively simple, with fewer and less complex components and hence lower cost than prior signs. Further, in some embodiments the Applicant proposes a plurality of transient suppression components and/or a plurality of transient suppression loops, providing diverse mechanisms for dispersing transients.

The Applicant's sign may use less energy than many prior art signs. In one embodiment, the energy requirement may be less than 2 W, compared to 5 W for prior art signs. In some embodiments the sign may draw less than 1 W, or less than 0.75 W, while in the embodiment of FIG. 4, the energy requirement may be as low as around 0.5 W. The Applicant believes such a low power LED source to be adequate for exciting suitable photoluminescent materials and providing sufficient PL glow to meet minimum standards for glow time. Due at least in part to this low power rating, the Applicant's use of inline transient suppression components does not significantly impact on efficiency. Or, viewed differently, the Applicant's current limiting arrangement of FIG. 4 is expected to draw only around 0.05 W, with approximately 0.5 W used to power the LEDs at a level just sufficient to provide the required glow time, or 0.55 W in total. In contrast, one prior sign uses around 1.46 W in the LED driver circuitry and current balancing resistors for parallel connected LEDs and around 1.08 W is used in powering the LEDs (providing more light than necessary for the application), or approximately 2.5 W in total.

In preferred embodiments, the Applicant's circuit relies on a relatively small number of components compared to circuits used in some prior art hybrid PL/LED signs. Electrolytic capacitors are excluded. Power is provided directly from the rectifier to the LEDs, without any or without significant smoothing. As the transient suppression is effective in dealing with expected surges, no trip circuit is needed. The simpler circuit provides lower cost and complexity, as well as improvements in circuit lifetime.

The Applicant's hybrid signs may therefore provide improved lifetime, cost and energy use.

In some embodiments the Applicant's sign may be adapted for connection to other sources in addition to the mains, including e.g. backup power systems, batteries, smoke detection, fire alarm, security or telecommunications systems etc. In further embodiments a monitoring arrangement may provide an alarm or indicator in the event that a sign fails (whether due to power or hardware failure).

While the present invention has been illustrated by the description of the embodiments thereof, and while the embodiments have been described in detail, it is not the intention of the Applicant to restrict or in any way limit the scope of the appended claims to such detail. Further, the above embodiments may be implemented individually, or may be combined where compatible. Additional advantages and modifications, including combinations of the above embodiments, will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A sign comprising:

one or more photoluminescent elements; and an electrical circuit comprising an AC circuit;

a rectifier; and a DC circuit portion;

wherein the DC circuit portion comprises one or more light emitting diodes (LEDs), the one or more light emitting diodes (LEDs) arranged to excite the one or more photoluminescent elements;

wherein the AC circuit is connected to an AC power source and supplies power to the rectifier and the rectifier supplies a rectified power supply to the DC circuit portion;

wherein the AC circuit receives AC power from an AC source, the AC circuit configured to reduce a transient current supplied to the rectifier;

wherein the AC circuit comprises a first transient suppression circuit used during normal operation, where power runs in series through at least two capacitors and at least two resistors to the rectifier, the first transient suppression circuit configured to act to reduce a voltage and current of the AC source to a level suitable for powering the LEDs;

wherein the AC circuit is configured to reduce the transient current supplied to the rectifier to less than 1/100th of an original transient size entering the AC circuit arranged for connection to an AC power supply and supplying power to the LEDs.

2. The sign as claimed in claim 1, wherein the AC circuit comprises a further transient suppression circuit comprising at least one resistance loop in combination with one capacitor of the at least two capacitors of the first transient suppression circuit, the at least one resistance loop configured to limit said transient current.

3. The sign as claimed in claim 1, wherein the AC circuit comprises a shunt transient suppression device connected in parallel located after the at least two resistors of the first transient suppression circuit.

4. The sign as claimed in claim 3, wherein the AC circuit comprises an RC circuit, the RC circuit comprising at least one further capacitor and at least one further resistor, the RC circuit being parallel loop connected and located downstream of the shunt transient suppression device, the RC circuit configured to further filter any remaining transient.

5. The sign as claimed in claim 4, wherein the RC circuit is located after the at least two resistors of the first transient suppression circuit.

6. The sign as claimed in claim 3, wherein the shunt transient suppression device is located in the AC circuit after the AC power passes through at least one of the at least two resistors and prior to the rectifier.

7. The sign as claimed in claim 3, wherein the shunt transient suppression device is a transient suppression diode.

8. The sign as claimed in claim 1, wherein the DC circuit portion comprises only said LEDs, with unsmoothed or substantially unsmoothed rectified power being supplied from the rectifier to the DC circuit portion, the DC circuit portion being free of transient suppression components and electrolytic capacitors.

9. The sign as claimed in claim 1, wherein the AC power source is a mains source.

10. The sign as claimed in claim 1, wherein the LEDs are powered by substantially unsmoothed rectified power at twice a frequency of the AC power supply, resulting in a flicker of the LEDs at twice the frequency of the AC power supply.

11. The sign as claimed in claim 1, wherein a first resistor of the at least two resistors in the first transient suppression circuit comprises a greater resistance than a second or further resistor in the first transient suppression circuit.

12. The sign as claimed in claim 1, wherein the AC circuit is configured to smooth power surges to a final current reaching the LEDs being approximately equal to or less than 10A.

13. The sign as claimed in claim 1, wherein the sign further comprises a frame or housing formed by a rear element, a transparent front element and the one or more photoluminescent elements are arranged to emit light through a sign element.

14. The sign as claimed in claim 13, wherein the one or more photoluminescent elements are translucent.

15. The sign as claimed in claim 13, wherein the one or more photoluminescent elements are a photoluminescent plate and the sign element is a graphic mask.

16. The sign as claimed in claim 13, wherein light emitted by the one or more LEDs passes through a light pipe or a guide plate, and the light pipe or the guide plate are configured to disperse LED light emitted by the one or more LEDs so that the LED light falls evenly over a surface of the one or more photoluminescent elements.

17. The sign as claimed in claim 13, wherein an inner surface of the rear element is reflective such that LED light or photoluminescent light incident upon the rear element is redirected towards the sign element and the transparent front element.

18. A sign comprising:

one or more photoluminescent elements; and an electrical circuit comprising an AC circuit;

a rectifier; and a DC circuit portion;

wherein the DC circuit portion comprises one or more light emitting diodes (LEDs), the one or more light emitting diodes (LEDs) arranged to excite the one or more photoluminescent elements;

wherein the AC circuit is connected to an AC power source and supplies power to the rectifier and the rectifier supplies a rectified power supply to the DC circuit portion;

wherein the AC circuit receives AC power from an AC source, the AC circuit configured to reduce a transient current supplied to the rectifier;

wherein the AC circuit comprises a first transient suppression circuit used during normal operation, where power runs in series through at least two capacitors and at least two resistors to the rectifier, the first transient suppression circuit configured to act to reduce a voltage and current of the AC source to a level suitable for powering the LEDs, and a shunt transient suppression device connected in parallel located after the at least two resistors of the first transient suppression circuit;

wherein the AC circuit is configured to reduce the transient current supplied to the rectifier to less than 1/100th of an original transient size entering the AC circuit arranged for connection to an AC power supply and supplying power to the LEDs;

wherein the LEDs are powered by substantially unsmoothed rectified power at twice a frequency of the AC power supply, resulting in a flicker of the LEDs at twice the frequency of the AC power supply.

* * * * *